United States Patent
Uptergrove

(10) Patent No.: US 8,522,989 B2
(45) Date of Patent: Sep. 3, 2013

(54) PLASTIC CONTAINERS WITH A BASE COAT THEREON

(75) Inventor: Ronald L. Uptergrove, Canton, MI (US)

(73) Assignee: Plastipak Packaging, Inc., Plymouth, MI (US)

(*) Notice: Subject to any disclaimer, the term of this patent is extended or adjusted under 35 U.S.C. 154(b) by 1113 days.

(21) Appl. No.: 11/716,447

(22) Filed: Mar. 9, 2007

(65) Prior Publication Data

US 2007/0264454 A1   Nov. 15, 2007

Related U.S. Application Data

(60) Provisional application No. 60/798,900, filed on May 9, 2006.

(51) Int. Cl.
*B41J 2/01* (2006.01)

(52) U.S. Cl.
USPC ....... 215/12.2; 206/459.5; 347/104; 428/35.7

(58) Field of Classification Search
USPC ..... 215/12.2; 220/737, 903, 715; 206/459.5; 428/35.7, 195.1; 347/100, 101, 104, 107
See application file for complete search history.

(56) References Cited

U.S. PATENT DOCUMENTS

| | | | |
|---|---|---|---|
| 3,417,175 A * | 12/1968 | Brown et al. | 264/220 |
| 3,490,363 A | 1/1970 | Derrickson | |
| 3,999,190 A | 12/1976 | Brown et al. | |
| 4,074,279 A | 2/1978 | Ikeda et al. | |
| 4,519,310 A * | 5/1985 | Shimizu et al. | 101/35 |
| 5,011,862 A * | 4/1991 | Melber et al. | 521/54 |
| 5,182,571 A | 1/1993 | Creagh et al. | |
| 5,411,140 A * | 5/1995 | Byer | 206/504 |
| 5,624,743 A * | 4/1997 | Malhotra | 428/216 |
| 5,753,325 A * | 5/1998 | McDaniel | 428/34.7 |
| 5,858,514 A | 1/1999 | Bowers | |
| 5,984,456 A | 11/1999 | Bern | |
| 6,002,844 A | 12/1999 | Kishida et al. | |
| 6,082,563 A * | 7/2000 | Kohn et al. | 215/12.2 |
| 6,135,654 A | 10/2000 | Jennel | |
| 6,235,358 B1 * | 5/2001 | Goto et al. | 428/35.7 |
| 6,406,115 B2 | 6/2002 | Mantell et al. | |
| 6,409,294 B1 | 6/2002 | Zimmermann et al. | |

(Continued)

FOREIGN PATENT DOCUMENTS

| | | |
|---|---|---|
| EP | 0088630 A2 | 9/1983 |
| EP | 0209896 A2 | 1/1987 |

(Continued)

OTHER PUBLICATIONS

International Searching Authority; PCT/US07/07437; International Search Report and Written Opinion, mailed Aug. 27, 2008.

(Continued)

*Primary Examiner* — Stephen Castellano

(74) *Attorney, Agent, or Firm* — Dykema Gossett PLLC

(57) ABSTRACT

A hollow plastic container having a closed lower supporting base, a sidewall extending upwardly from the closed base, and an upper portion having a dispensing opening therein extending upwardly from the sidewall. The container also includes a digitally printed base coat on the sidewall having a thickness of from 1 to 200 microns, and preferably includes printed areas over at least portions of the base coat to provide a distinctive appearance.

31 Claims, 4 Drawing Sheets

(56) References Cited

U.S. PATENT DOCUMENTS

| | | |
|---|---|---|
| 6,513,435 B2 | 2/2003 | Detzner |
| 6,706,342 B2 * | 3/2004 | Kong et al. .................. 428/34.1 |
| 6,749,913 B2 * | 6/2004 | Watanabe et al. ............ 428/36.5 |
| 6,769,357 B1 | 8/2004 | Finan |
| 6,837,376 B2 * | 1/2005 | Pauli ......................... 206/459.5 |
| 7,133,058 B2 | 11/2006 | Lee |
| 7,579,388 B2 | 8/2009 | Kiefer |
| 2002/0097280 A1 | 7/2002 | Loper et al. |
| 2003/0000909 A1 | 1/2003 | Sakaguchi et al. |
| 2005/0211371 A1 | 9/2005 | Hirst et al. |
| 2006/0250464 A1 | 11/2006 | Sheinman |

FOREIGN PATENT DOCUMENTS

| | | |
|---|---|---|
| EP | 0385624 A1 | 9/1990 |
| JP | 5330402 | 3/1978 |
| JP | 55-176136 | 12/1980 |
| JP | 62-221472 A | 9/1987 |
| JP | 08-072885 | 3/1996 |
| JP | 2004244077 A | 9/2004 |
| JP | 2005119097 A | 5/2005 |
| JP | 2005119243 | 5/2005 |
| JP | 2005283968 A | 10/2005 |
| JP | 2005313457 A | 11/2005 |
| WO | 9908935 A1 | 2/1999 |
| WO | WO 03/002349 A2 | 1/2003 |
| WO | 2004043702 A1 | 5/2004 |

OTHER PUBLICATIONS

Japan Patent Office; Office Action dated Feb. 22, 2011 in counterpart Japanese Patent Application No. 2007-123636.

* cited by examiner

PLASTIC CONTAINERS WITH A BASE COAT THEREON

CROSS-REFERENCE TO RELATED APPLICATIONS

This application is based on provisional U.S. Patent Application Ser. No. 60/798,900, filed May 9, 2006.

BACKGROUND OF THE INVENTION

The present invention relates to plastic containers having a base or undercoat thereon, particularly a digitally printed base coat.

It is highly desirable to provide a plastic container with sharp and clear printing and/or pictorial designations thereon. Conventional techniques for printing onto plastic containers, especially those having curved surfaces thereon, are subject to significant drawbacks. For example, it is difficult to obtain proper registration between colors, and changing images, designs or wording is expensive and time consuming. Inkjet printing with multiple nozzles is useful for flat surfaces; however, it is difficult to satisfactorily use multiple nozzles on curved surfaces.

It would be highly desirable to provide a plastic container, especially those having a curved surface, with good printing, images and/or pictorial designations thereon, wherein the resultant container has optimal image and/or print quality. It would be particularly desirable to print a digitally generated image directly onto a plastic container, particularly a curved plastic container, wherein the printing can be done at a reasonable speed and at a reasonable cost.

SUMMARY OF THE INVENTION

In accordance with the present invention the foregoing objectives are readily achieved.

The present invention provides a plastic container, particularly a curved plastic container, with a digitally printed base or undercoat. The containers with the digitally printed base coat are desirably provided with an outer label printed over the base coat as, for example, an inkjet coated label. The label or the printed area over the base coat can be simply a graphical or product or trademark designation, and are preferably comprised of digitally printed ink or a variety of digitally printed ink colors. The base coat may be either clear or colored, as an opaque color. The base coat desirably enhances the look of the outer coated label by adding layering effects with varying thicknesses of ink which provides a three dimensional effect.

Thus, in accordance with the present invention the container of the present invention comprises: a hollow plastic container having a closed lower supporting base, a sidewall extending upwardly from the closed base; and an upper portion having a dispensing opening therein extending upwardly from the sidewall; and a digitally printed base coat on said sidewall, wherein said base coat has a thickness of from 1 to 200 microns. Preferably there are printed areas over at least portions of said base coat. In an advantageous embodiment portions of the sidewall are uncoated.

Further features and advantages of the present invention will be discussed hereinbelow.

BRIEF DESCRIPTION OF THE DRAWINGS

The present invention will be more readily understandable from a consideration of the following illustrative drawings, wherein.

DETAILED DESCRIPTION OF PREFERRED EMBODIMENTS

Figure 1:
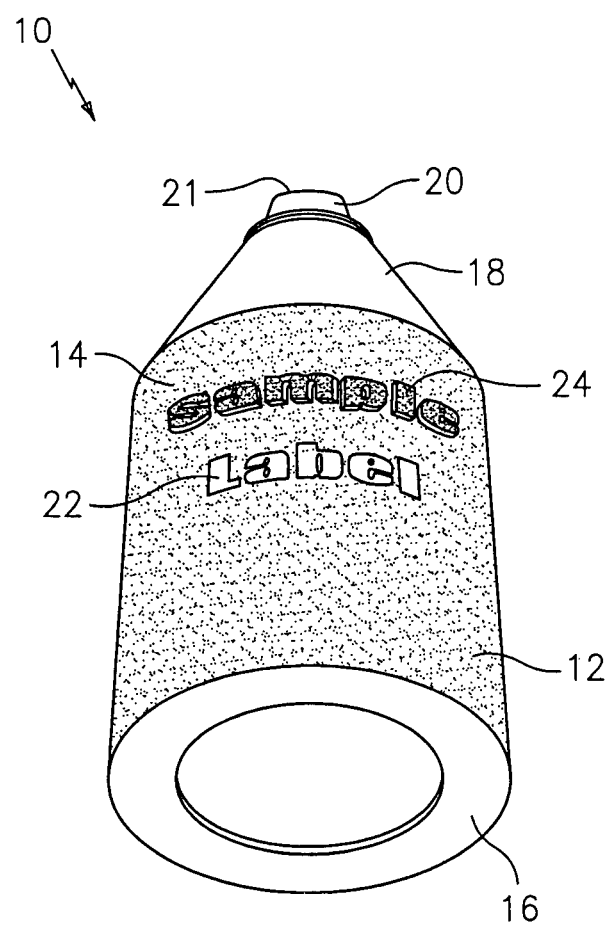
FIG. 1 is a perspective view of a plastic container of the present invention with a digitally printed base coat and a printed area over the digitally printed base coat.

As can be seen in FIG. 1, blow molded plastic container 10 is provided having a base coat 12 which has been digitally printed thereon. The digital printing procedure desirably includes clamping the empty container and optionally applying internal pressure to the inside of the container, as for example at a pressure range starting at a vacuum, e.g., from −1 psi to 5 psi. The clamped and pressurized container is preferably pre-treated, as by a heat treatment or corona treatment, to raise the surface energy of the container to insure ink adhesion thereon. The thus treated container will then have the desired base or undercoat digitally printed thereon. This may be a direct drop on demand inkjet head or an indirect drop on demand inkjet pad. If desired, the digitally printed area could be silk screened or manually applied with a drawdown tool. U.V. ink may be applied directly on the desired container surface in one pass. The container thus printed with a base coat will then be treated in a curing station to cure the base coat thus applied.

As shown in FIG. 1, a digitally printed base coat 12 is applied on the container 10 sidewall 14, with base area 16, shoulder area 18 and neck or upper area 20 with dispensing opening 21 therein left untreated. The base coat is preferably provided circumferentially on substantially the entire sidewall, although one can readily leave desired areas of the sidewall untreated. In addition, in the embodiment shown in FIG. 1 reverse print area 22 identified by the word "label" is uncoated; whereas the raised print area 24 identified by the word "sample" is printed over the base coat and can be seen to have a three dimensional appearance. Additional printing can be applied to the remainder of the base coat to provide a desired color and/or label appearance, with identification, pictorial representations, descriptive material or the like thereon. Similarly, the uncoated, reverse print area has a distinctive, three dimensional appearance.

As indicated above, the base coat can have any desired appearance, as with a clear or opaque color. In the embodiment of FIG. 1 the base coat has a light color. The base coat has the effect of enhancing the look of the label printed or applied thereon, as by adding layering effects with varying thicknesses of ink which provides a three dimensional effect. The base coat may be applied in such a way as to allow the substrate color, bottle color or the like to show through as part of the graphic design of the label. This can be done in such a way as to accentuate certain blown-in characteristics of the container, such as lettering within a logo or distinctive features, such as water drops which are shown by way of example in FIGS. 2-4. The base coat can also at least in part have a raised or textured appearance to enhance the look, feel and/or grip.

Figure 2:
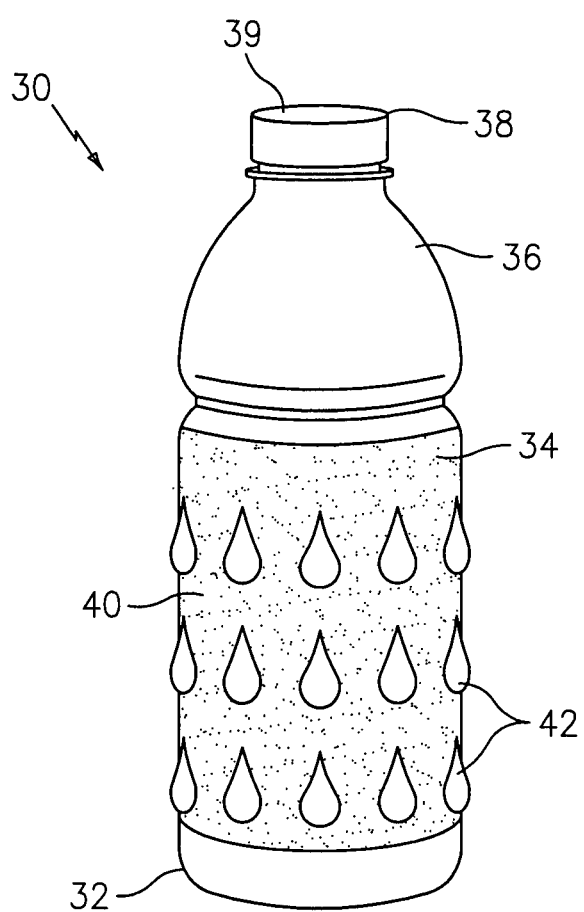
FIG. 2 is a side view of an alternate embodiment of a plastic container of the present invention with a digitally printed base coat.

Thus, FIG. 2 shows an alternate embodiment of a blow molded plastic container 30 having a base 32, sidewall 34, shoulder portion 36 and neck or upper portion 38 with dispensing opening 39 therein, similar to that shown in FIG. 1.

Sidewall portion 34 is provided with a digitally printed base coat 40, as with base coat 12 in FIG. 1 and shoulder portion 36, neck or upper portion 38 and base 32 are uncoated. However, the blown in water drop configurations 42 have no base coat thereon. Therefore, when a label area is printed over the base coat as in FIG. 1 and not over the water drop configurations, the distinctive container sidewall will be quite impressive, with the water drops 42 having no printing or coating thereover.

Figure 3:
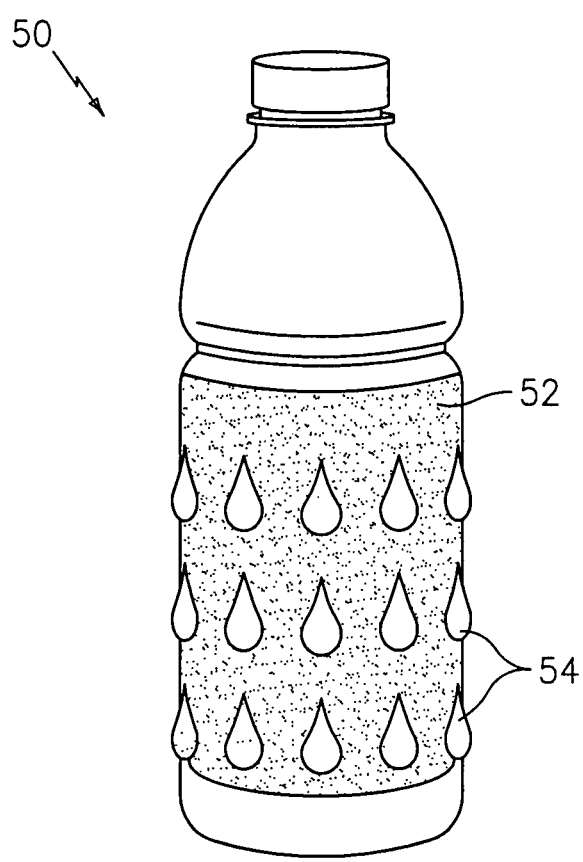
FIG. 3 is a side view of a plastic container as shown in FIG. 2 with a thicker digitally printed base coat.
Figure 4:
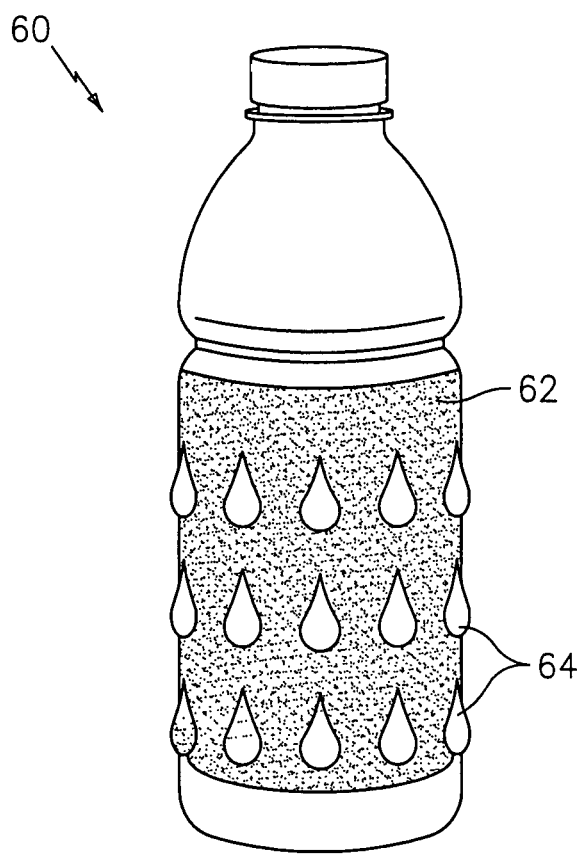
FIG. 4 is a side view of a plastic container as shown in FIG. 3 with a thicker digitally printed base coat.

Container 50 in FIG. 3, similar to container 40, has a digitally printed base coat 52 and water drops 54 which are uncoated. However, base coat 52 is thicker than base coat 40 and the thicker portions have a darker appearance. Similarly, container 60 in FIG. 4, similar to container 40, has a digitally printed base coat 62 and water drops 64 which are uncoated. However, base coat 62 is thicker than base coat 52 and has a still darker appearance. Therefore, when a label area is printed over the base coats in FIGS. 3 and 4 as in FIG. 1 and not over the water drop configurations, the distinctive container sidewall will be quite impressive as with FIG. 2. If desired, one can provide the thicker base coat portions over only portions of the sidewall to give a light-dark color arrangement or a variation in color appearance.

The container of the present invention with digitally printed base coat has significant advantages. The base coat, which can be white, opaque or any desired color, allows for better color management typical of inkjet processes. The base coat provides a consistent and uniform surface which can conveniently receive multicolor graphics via an inkjet process. Moreover, the digitally printed base coat provides the proper surface energy (dynes per square centimeter) required for optimal image/print quality.

The base coat is from 1 to 200 microns thick, preferably from 3 to 100 microns thick and optimally from 15 to 50 microns thick. The base coat has desirable features, as it is generally chemical resistant, scratch or scuff resistant and can be solvent based, water based or radiation curable. Moreover, a wide variety of base coat colors can be used, preferably clear or opaque. The base coat can provide a barrier layer for decreased permeability of the surface that is applied. The specific gravity of the base coat should be at least one, and is preferably from 1.25 to 1.5. Moreover, a wide variety of application methods can be used and distinctive features or designs can readily be printed or applied thereover.

It is to be understood that the invention is not limited to the illustrations described and shown herein, which are deemed to be merely illustrative of the best modes of carrying out the invention, and which are susceptible of modification of form, size, arrangement of parts and details of operation. The invention rather is intended to encompass all such modifications which are within its spirit and scope as defined by the claims.

What is claimed is:

1. A container which comprises:
a hollow plastic container having a closed lower supporting base, a sidewall extending upwardly from the closed base, an upper portion having a dispensing opening therein extending upwardly from the sidewall, an inwardly oriented shoulder portion extending between said sidewall and said upper portion; and
a digitally printed ink base coat in direct contact with said sidewall, wherein said base coat is comprised of digitally printed and cured ink and has a thickness of from 1 to 200 microns, and including a digitally printed raised print area provided on at least a portion of said base coat, the raised print area comprising a raised digitally printed letter, such raised digitally printed letter comprising droplets of cured digitally printed ink.

2. A container according to claim 1, including portions of said sidewall which are uncoated.

3. A container according to claim 2, wherein the sidewall includes outwardly extending portions which are uncoated.

4. A container according to claim 3, wherein the outwardly extending portions have a water drop configuration.

5. A container according to claim 2, wherein the uncoated, sidewall portions have a three dimensional appearance.

6. A container according to claim 1, wherein said sidewall has a curved external surface.

7. A container according to claim 1, wherein the container includes a plurality of raised print areas, each raised print area including a raised digitally printed letter, and wherein portions of the sidewall are uncoated.

8. A container according to claim 7, wherein said shoulder portion is free from said base coat.

9. A container according to claim 1, wherein the base coat is one of clear and colored.

10. A container according to claim 1, wherein the container is a blow molded plastic container.

11. A container according to claim 1, wherein the container is pretreated before applying the base coat by one of a heat treatment and corona treatment.

12. A container according to claim 1, wherein the digitally printed base coat is cured after application of the base coat.

13. A container according to claim 1, wherein the base coat is 3 to 100 microns in thickness.

14. A container according to claim 1, wherein the base coat at least in part has a raised appearance.

15. A container according to claim 1, wherein the specific gravity of the base coat is at least 1.

16. A container according to claim 15, wherein the specific gravity of the base coat is 1.25 to 1.5.

17. A container according to claim 1, wherein the printed areas over the base coat comprise a printed label.

18. A container according to claim 1, wherein the container includes at least two raised print areas, each raised print area includes at least one raised digitally printed letter, and at least a portion of the side wall of the container between the digitally printed letters provided on separate raised print areas is not coated with the base coat.

19. A container according to claim 1, wherein the base coat is provided circumferentially on substantially the entire sidewall.

20. A container according to claim 1, wherein the printed areas have a raised print appearance.

21. A container according to claim 1, wherein the sidewall at least in part has a thicker base coat to provide a darker appearance.

22. A container according to claim 1, wherein the base coat comprises a U.V. ink that is applied in one pass.

23. A container which comprises:
a molded hollow plastic container including a closed lower supporting base, a sidewall extending upwardly from the closed base, and an upper portion having a dispensing opening therein extending upwardly from the sidewall, a shoulder portion extending between said sidewall and said upper portion; and
a digitally printed base coat comprised of a digitally printed and cured ink in direct ink-to-surface contact with said sidewall, wherein the digitally printed ink is cured and said base coat has a thickness of from 1 to 200 microns, and including digitally printed areas comprised of droplets of digitally printed and cured ink provided directly on at least portions of said base coat, wherein at least two digitally printed raised areas each include at least one raised digitally printed letter.

24. A container according to claim 23, wherein the container includes a colored sidewall and that color shows through as part of a graphic design.

25. A container according to claim 23, wherein portions of the sidewall are uncoated.

26. A container according to claim 23, wherein the sidewall includes uncoated portions that form letters.

27. A container according to claim 23, wherein the base coat provides a consistent and uniform surface, and the at least two digitally printed raised areas extend outwardly from the base coat and provide a structural layering effect with a varying thickness relative to the adjacent base coat.

28. A container according to claim 23, wherein the ink base coat is comprised of an ink that is curable with ultraviolet light.

29. A container according to claim 23, wherein the digitally printed raised print area is comprised of droplets of digitally printed and cured ink that is curable with ultraviolet light.

30. A container according to claim 23, wherein the raised print area is a different color than the base coat.

31. A container comprising:
a molded hollow plastic container including a closed lower supporting base, a sidewall extending upwardly from the closed base, and an upper portion having a dispensing opening therein extending upwardly from the sidewall; wherein:
the sidewall includes an outwardly extending portion;
a digitally printed ink base coat is provided in direct ink-to-surface contact with the outwardly extending portion, the digitally printed ink base coat is cured, and the digitally printed ink base coat has a thickness of from 1 to 200 microns; and
a digitally printed raised print area comprised of droplets of digitally printed and cured ink, the digitally printed raised print area being provided upon at least a portion of the base coat provided on the outwardly extending portion, and the raised print area is a different color than the base coat.

* * * * *